(12) United States Patent
Dutu et al.

(10) Patent No.: US 11,481,250 B2
(45) Date of Patent: Oct. 25, 2022

(54) COOPERATIVE WORKGROUP SCHEDULING AND CONTEXT PREFETCHING BASED ON PREDICTED MODIFICATION OF SIGNAL VALUES

(71) Applicant: ADVANCED MICRO DEVICES, INC., Santa Clara, CA (US)

(72) Inventors: Alexandru Dutu, Bellevue, WA (US); Matthew David Sinclair, Bellevue, WA (US); Bradford Beckmann, Bellevue, WA (US); David A. Wood, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 149 days.

(21) Appl. No.: 16/024,244

(22) Filed: Jun. 29, 2018

(65) Prior Publication Data
US 2020/0004586 A1  Jan. 2, 2020

(51) Int. Cl.
*G06F 9/48* (2006.01)
*G06F 9/30* (2018.01)
*G06F 9/38* (2018.01)
*G06F 9/52* (2006.01)

(52) U.S. Cl.
CPC .......... *G06F 9/4881* (2013.01); *G06F 9/3009* (2013.01); *G06F 9/30047* (2013.01); *G06F 9/3836* (2013.01); *G06F 9/52* (2013.01)

(58) Field of Classification Search
None
See application file for complete search history.

(56) References Cited

U.S. PATENT DOCUMENTS

| | | | |
|---|---|---|---|
| 6,243,736 B1 * | 6/2001 | Diepstraten | G06F 9/4843 718/103 |
| 7,493,621 B2 * | 2/2009 | Bradford | G06F 9/463 711/123 |
| 2003/0196015 A1 * | 10/2003 | Limoges | G06F 9/526 710/200 |

(Continued)

OTHER PUBLICATIONS

Diamos, Gregory, et al., "Persistent RNNs: Stashing Recurrent Weights On-Chip", Proceedings of the 33rd International Conference on Machine Learning, New York, NY, Feb. 17, 2016, 10 pages.

(Continued)

*Primary Examiner* — Michael W Ayers

(57) ABSTRACT

A first workgroup is preempted in response to threads in the first workgroup executing a first wait instruction including a first value of a signal and a first hint indicating a type of modification for the signal. The first workgroup is scheduled for execution on a processor core based on a first context after preemption in response to the signal having the first value. A second workgroup is scheduled for execution on the processor core based on a second context in response to preempting the first workgroup and in response to the signal having a second value. A third context it is prefetched into registers of the processor core based on the first hint and the second value. The first context is stored in a first portion of the registers and the second context is prefetched into a second portion of the registers prior to preempting the first workgroup.

20 Claims, 9 Drawing Sheets

(56) References Cited

U.S. PATENT DOCUMENTS

| | | | |
|---|---|---|---|
| 2004/0216097 A1* | 10/2004 | Sun | G06F 12/0891 |
| | | | 717/154 |
| 2006/0248281 A1* | 11/2006 | Al-Sukhni | G06F 9/3832 |
| | | | 711/137 |
| 2011/0173630 A1* | 7/2011 | Arimilli | G06F 9/52 |
| | | | 718/107 |
| 2014/0157287 A1* | 6/2014 | Howes | G06F 9/461 |
| | | | 718/108 |
| 2014/0282561 A1* | 9/2014 | Holt | G06F 9/462 |
| | | | 718/102 |
| 2016/0062797 A1* | 3/2016 | Holt | G06F 9/3009 |
| | | | 718/108 |
| 2016/0357677 A1* | 12/2016 | Hooker | G06F 12/0862 |
| 2017/0132140 A1* | 5/2017 | Lin | G06F 9/3808 |
| 2018/0293102 A1* | 10/2018 | Ray | G06T 1/20 |
| 2018/0293692 A1* | 10/2018 | Koker | G06T 1/20 |

OTHER PUBLICATIONS

Diamos, Gregory, "Persisten RNNs: 30 Times Faster RNN Layers at Small Mini-Batch Sizes", Silicon Valley AI Lab, Baidu Research, Mar. 25, 2016, 6 pages.

Blasgen, Mike, et al., "The Convoy Phenomenon", IBM Research Laboratory, May 1977, 9 pages.

U.S. Appl. No. 15/661,843, filed Jul. 27, 2017 in the name of Alexandru Dutu et al., 35 pages.

\* cited by examiner

COOPERATIVE WORKGROUP SCHEDULING AND CONTEXT PREFETCHING BASED ON PREDICTED MODIFICATION OF SIGNAL VALUES

STATEMENT REGARDING FEDERALLY SPONSORED RESEARCH OR DEVELOPMENT

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Processing units such as graphics processing units (GPUs) and general-purpose graphics processing units (GPGPUs) typically include a large number of processor cores that are configured to execute instructions concurrently or in parallel. The processing units are organized into a hierarchy and the smallest elements of the hierarchy are configured according to single-instruction-multiple-data (SIMD) protocols to concurrently execute the same instruction on multiple data sets using multiple processor cores. The smallest elements are therefore referred to as SIMD units. A hierarchical execution model is used to match the hierarchy implemented in hardware. The execution model defines a kernel of instructions that are executed by all the threads (also referred to as streams or work items). In some cases, the threads are dependent on each other. For example, producer threads generate an output and consumer threads use (or "consume") the output. The hardware hierarchy imposes limits on the amount of data that is shared among the processor cores. The data sharing limits are overcome, at least in part, by grouping threads into workgroups for concurrent execution on corresponding processor cores. Threads within a workgroup are then able to share data with each other. For example, producer-consumer threads are supported within a workgroup and use intra-workgroup data sharing. A recurrent neural network is an example of a producer-consumer application that is executed on a GPU or GPGPU. Recurrent neural networks are used to implement deep learning applications such as speech recognition, dictation, speech-to-text for language translation, and the like.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
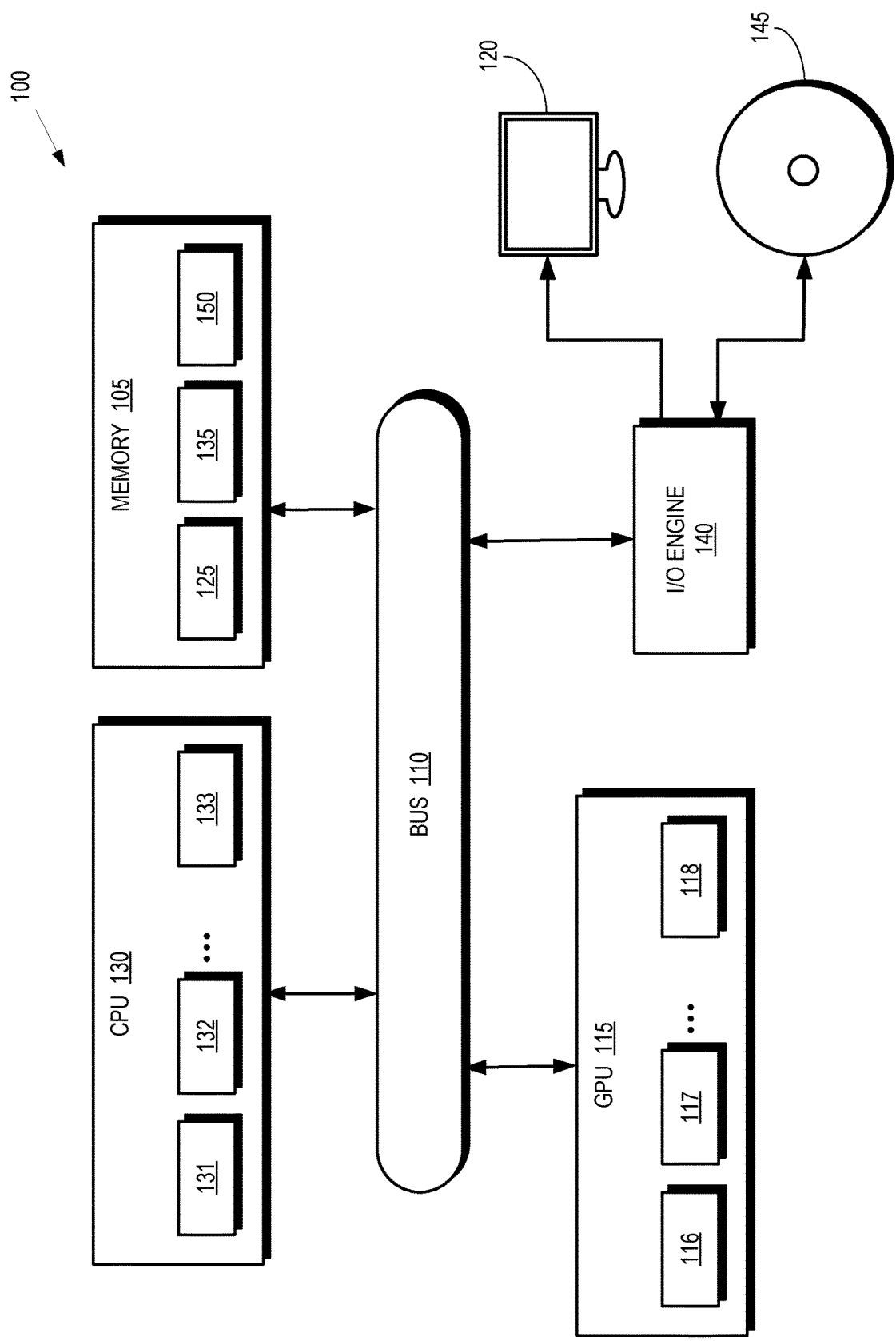
FIG. 1 is a block diagram of a processing system according to some embodiments.

Inter-workgroup synchronization of producer and consumer threads in a processing unit such as a graphics processing unit (GPU) or a general-purpose graphics processing unit (GPGPU) ensures that the output generated by the producer threads in one workgroup is available prior to executing the corresponding consumer threads in another workgroup. Conventional preemption is performed by a scheduler that preempts threads based on a policy such as periodically preempting threads after they have been executing for a predetermined amount of time. Cooperative scheduling preempts threads in response to the thread calling a preemption routine (or wait instruction) to inform the scheduler, which preempts the requesting thread in response to the thread calling the preemption routine. In some cases, preemptive multitasking coordinates producer/consumer threads to avoid deadlock scenarios and ensure forward progress of producer-consumer applications by preempting producer threads before executing the corresponding consumer threads. Preemption requires saving the context of the producer threads to a system memory prior to beginning execution of the corresponding consumer threads, which requires restoring context of the consumer threads from the system memory.

Conventional GPUs perform preemptive multitasking at kernel granularity by saving the contexts for threads in the workgroups that are currently executing on the processor cores and restoring the contexts for threads in the workgroups of the next kernel to execute on the processor cores. Cooperative scheduling is performed at workgroup granularity using wait instructions that indicate when each thread is waiting for a condition to be satisfied by another thread. Workgroups are preempted by saving their contexts and relinquishing hardware resources in response to all the threads in the workgroup executing a wait instruction. In either case, the overhead incurred by context switching is significant. The context for each thread includes information stored in different types of registers and a local data store. Thus, the overhead incurred by switching contexts includes saving and restoring many sets of registers and local data stores. For example, a workgroup can include 1024 threads so that switching contexts in cooperative workgroup scheduling requires saving/restoring 1024 sets of registers and local data stores. Consequently, the latency for context saving, restoring, or switching is a critical constraint on throughput of applications that perform preemption at either kernel or workgroup granularity.

FIGS. 1-9 disclose embodiments of techniques for reducing the latency incurred by workgroup preemption by prefetching contexts of workgroups into registers of processor cores based on hints received in wait instructions from preempted workgroups. For example, the efficiency of prefetching is improved by adding additional context to the wait instructions to indicate a modification to the signal that is being waited for and how many workgroups are waiting on the signal. In some embodiments, a first workgroup is executing on a processor core based on a first context stored in registers (and, in some cases, local data stores) of a processor core. The first workgroup is preempted in response to receiving a wait instruction from threads in the first workgroup. The wait instruction includes a first value of a signal, that indicates that the first workgroup is ready to resume execution and a hint that indicates a subsequent value of the signal. The preempted first workgroup waits to be scheduled in response to the signal acquiring the first value indicated in the wait instruction. A second workgroup is scheduled for execution on the processor core, based on a second context, in response to preemption of the first workgroup and in response to the signal acquiring a second value associated with the second workgroup. In some embodiments, the second context of the second workgroup was prefetched into the register files (and, in some cases, local data store) of the processor core prior to preemption of the first workgroup. A third context of a third workgroup is prefetched into the register files (and, in some cases, the local data store) based on a comparison of a third value of the signal associated with the third workgroup, a current value of the signal, and the hint included in the wait instruction received from the threads in the first workgroup. In some embodiments, the signal is modified by incrementing the signal by one or more threads, decrementing the signal by one or more threads, or exchanging values from a set of potential values of the signal. The hint in the wait instruction indicates the type of modification that is used to modify the signal, e.g., increment, decrement, or exchange. Some embodiments of the hint also indicate whether a single waiting workgroup is to be woken up in response to the signal having the value indicated in the wait instruction or multiple waiting workgroups are to be woken up.

FIG. 1 is a block diagram of a processing system 100 according to some embodiments. The processing system 100 includes or has access to a memory 105 or other storage component that is implemented using a non-transitory computer readable medium such as a dynamic random access memory (DRAM). However, the memory 105 can also be implemented using other types of memory including static random access memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a graphics processing unit (GPU) 115 that is configured to render images for presentation on a display 120. For example, the GPU 115 can render objects to produce values of pixels that are provided to the display 120, which uses the pixel values to display an image that represents the rendered objects. Some embodiments of the GPU 115 can also be used for general purpose computing. In the illustrated embodiment, the GPU 115 implements multiple processing elements 116, 117, 118 (collectively referred to herein as "the processing elements 116-118") that are configured to execute instructions concurrently or in parallel. In the illustrated embodiment, the GPU 115 communicates with the memory 105 over the bus 110. However, some embodiments of the GPU 115 communicate with the memory 105 over a direct connection or via other buses, bridges, switches, routers, and the like. The GPU 115 can execute instructions stored in the memory 105 and the GPU 115 can store information in the memory 105 such as the results of the executed instructions. For example, the memory 105 can store a copy 125 of instructions from a program code that is to be executed by the GPU 115.

The processing system 100 also includes a central processing unit (CPU) 130 that implements multiple processing elements 131, 132, 133, which are collectively referred to herein as "the processing elements 131-133." The processing elements 131-133 are configured to execute instructions concurrently or in parallel. The CPU 130 is connected to the bus 110 and can therefore communicate with the GPU 115 and the memory 105 via the bus 110. The CPU 130 can execute instructions such as program code 135 stored in the memory 105 and the CPU 130 can store information in the memory 105 such as the results of the executed instructions. The CPU 130 is also able to initiate graphics processing by issuing draw calls to the GPU 115.

An input/output (I/O) engine 140 handles input or output operations associated with the display 120, as well as other elements of the processing system 100 such as keyboards, mice, printers, external disks, and the like. The I/O engine 140 is coupled to the bus 110 so that the I/O engine 140 is able to communicate with the memory 105, the GPU 115, or the CPU 130. In the illustrated embodiment, the I/O engine 140 is configured to read information stored on an external storage component 145, which is implemented using a non-transitory computer readable medium such as a compact disk (CD), a digital video disc (DVD), and the like. The I/O engine 140 can also write information to the external storage component 145, such as the results of processing by the GPU 115 or the CPU 130.

Workgroups are scheduled for execution on the processor cores 116-118, 131-133 based on contexts associated with the workgroups. The contexts are stored in registers that are implemented in or associated with the processor cores 116-118, 131-133. In some embodiments, cooperative scheduling is performed at workgroup granularity using wait instructions that indicate when each thread is waiting for a condition to be satisfied by another thread. Workgroups are preempted by saving their contexts (and data stored in a local data store, if present) to a region 150 of the memory 105 and relinquishing hardware resources of the corresponding processor cores 116-118, 131-133 in response to all the threads in the workgroup executing a wait instruction. As discussed herein, the overhead incurred by switching contexts includes saving and restoring many sets of registers and local data stores to the region 150.

At least in part to reduce the latency for context saving, restoring, or switching during preemption at either kernel or workgroup granularity, wait instructions issued by the threads in a workgroup include a value of a signal. As used herein, the term "signal" refers to a location in a memory or register that is used to store a corresponding value that is accessible to schedulers or other entities in the processing system 100. The workgroup is scheduled for execution on one of the processor cores 116-118, 131-133 based on its context after preemption in response to the signal having the value indicated in the wait instruction. The wait instruction also includes a hint indicating a type of modification for the signal, such as increment, decrement, or exchange. Another workgroup is scheduled for execution on the processor core 116-118, 131-133 in response to preempting the workgroup and in response to the signal having a value associated with the other workgroup. As discussed herein, the hint and the value included in the wait instruction are used to predict a subsequent value of the signal. If the predicted value of the signal corresponds to a value associated with a waiting workgroup, a context for the waiting workgroup is prefetched from the region 150 into the registers (and, in some cases, the local data store) of the processor core 116-118, 131-133 that was executing the preempted workgroup.

Figure 2:
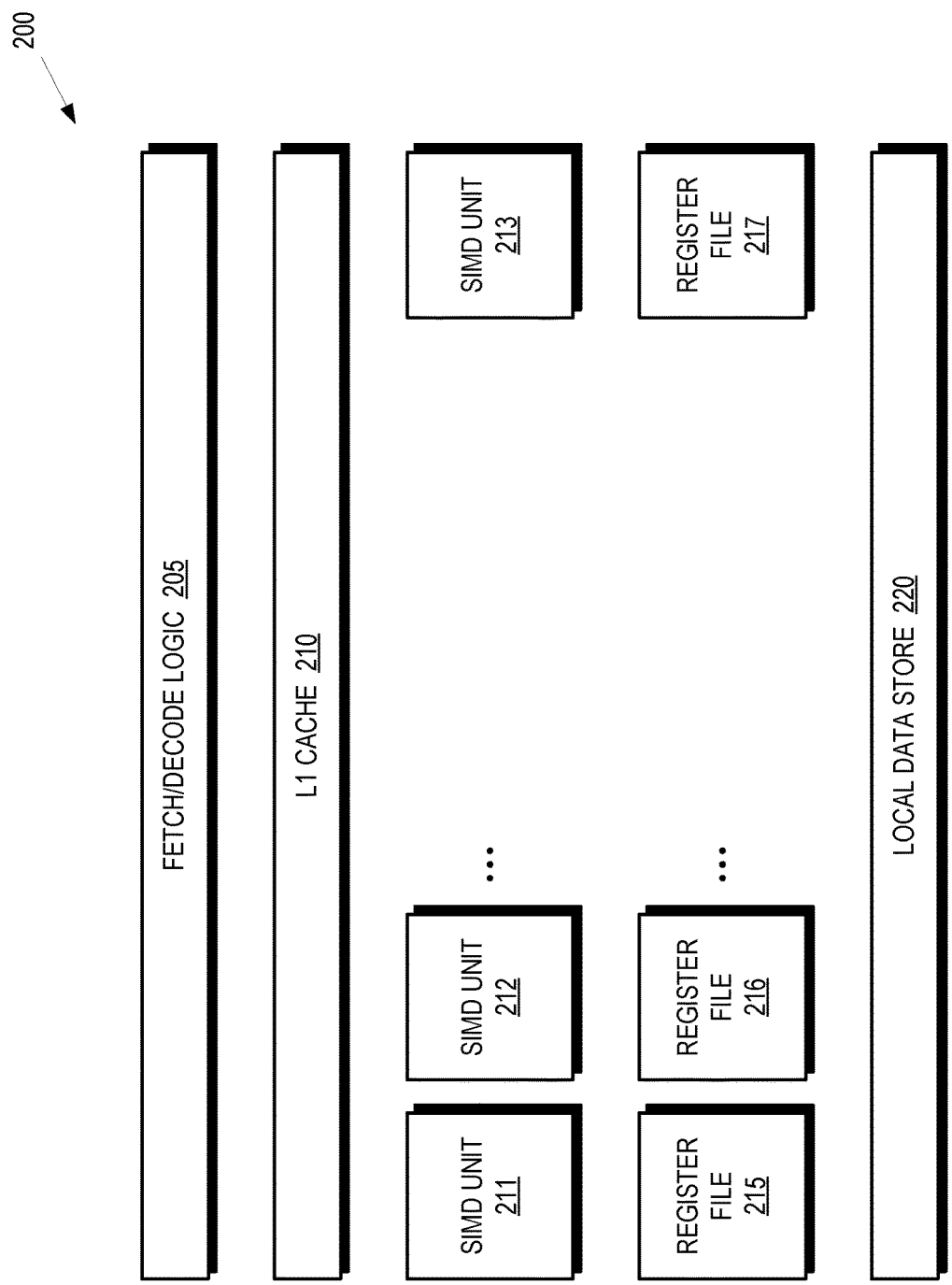
FIG. 2 is a block diagram of a processor core according to some embodiments.

FIG. 2 is a block diagram of a processor core 200 according to some embodiments. The processor core 200 is used to implement some embodiments of the processor cores 116-118, 131-133 shown in FIG. 1. The processor core 200 includes fetch/decode logic 205 that fetches and decodes instructions in the workgroups that are scheduled for execution by the processor core 200. Some embodiments of the processor core 200 execute threads in a workgroup. For example, the fetch/decode logic 205 can fetch a kernel of instructions that are executed by all the threads in the workgroup. The fetch/decode logic 205 then decodes the instructions in the kernel. The processor core 200 also includes a cache such as an L1 cache 210 that is used to store local copies of data and instructions that are used during execution of the threads in the workgroup.

A plurality of SIMD units 211, 212, 213 (collectively referred to herein as "the SIMD units 211-213") are used to execute threads of the workgroup concurrently or in parallel. For example, the SIMD units 211-213 can execute instructions in the same kernel using different input data to generate different output results. The SIMD units 211-213 are each associated with register files 215, 216, 217 (collectively referred to herein as "the register files 215-217") that are used to store information that defines a context of the corresponding SIMD units 211-213 while executing instructions in a thread. Values are stored in the register files 215-217 in response to threads being scheduled for execution on the SIMD units 211-213. The values can be modified by the SIMD units 211-213 to reflect the changing context of the SIMD units 211-213 in response to execution of instructions on the SIMD units 211-213. The values stored in the register files 215-217 are copied to an external memory (such as the memory 105 shown in FIG. 1). The values are then erased from the register files 215-217 (or written over by new context information for a different instruction or workgroup) in response to preemption of instructions or workgroups executing in the processor core 200.

A local data store 220 is used to store data that is generated by or used by the SIMD units 211-213. Some embodiments of the local data store 220 are partitioned to provide separate regions for each of the SIMD units 211-213. The local data store 220 is also used to facilitate exchange or sharing of data between the SIMD units 211-213. For example, producer threads generate an output and consumer threads use (or "consume") the output. Producer-consumer threads within a workgroup executing on the processor core 200 are able to share data via the local data store 220. Data associated with threads of a workgroup is stored in the local data store 220 in response to threads being scheduled for execution on the SIMD units 211-213. In some embodiments, the information stored in the local data store 220 is modified in response to execution of instructions by the SIMD units 211-213. Information in the local data store 220 that is associated with threads or workgroups executing on the SIMD units 211-213 is written to an external memory (such as the memory 105 shown in FIG. 1) in response to preemption of the thread or workgroup.

Figure 3:
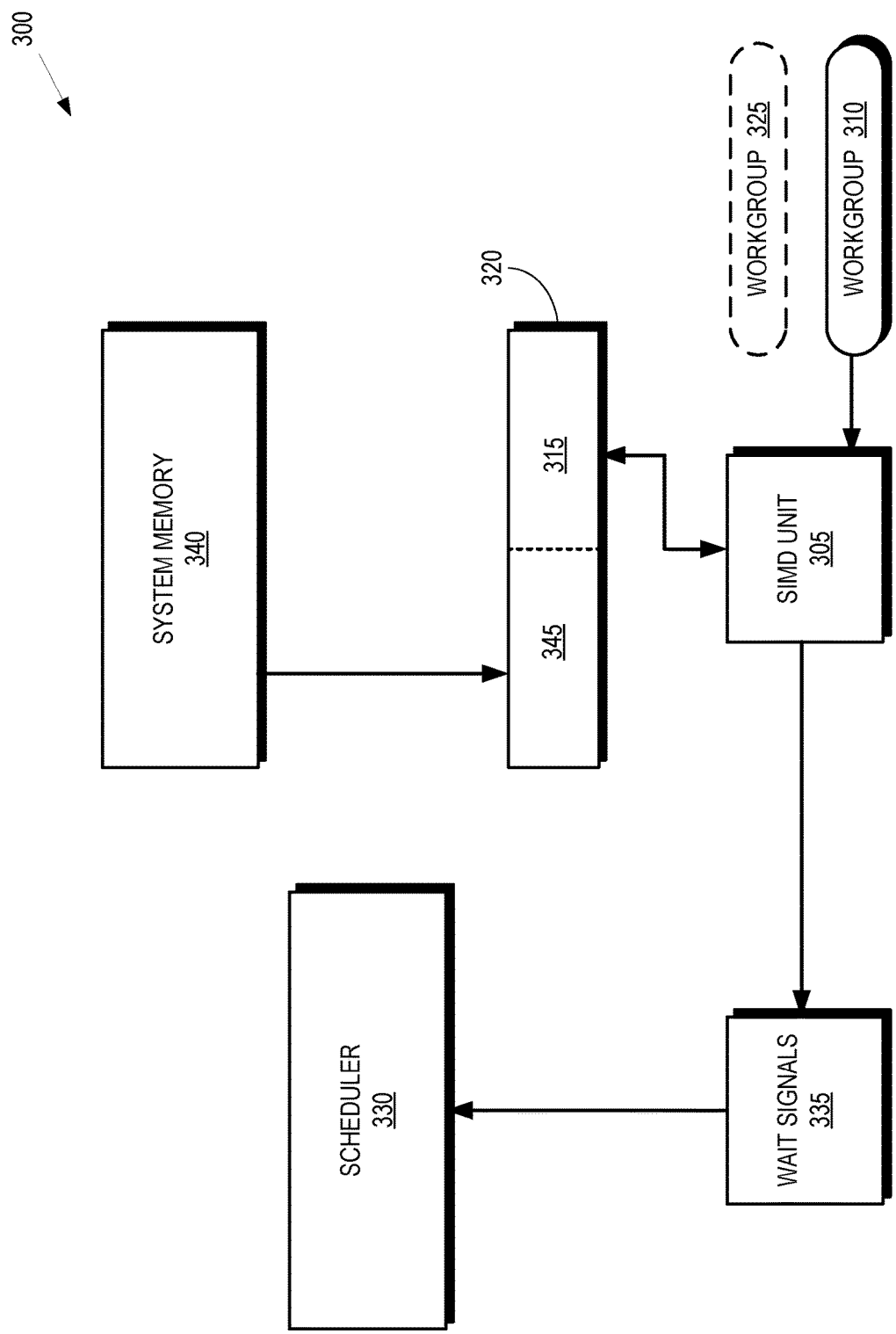
FIG. 3 is a block diagram of a portion of a processing system that implements workgroup preemption and prefetching of contexts according to some embodiments.

FIG. 3 is a block diagram of a portion 300 of a processing system that implements workgroup preemption and prefetching of contexts according to some embodiments. The portion 300 is used to implement some embodiments of the processing system 100 shown in FIG. 1 and the processor core 200 shown in FIG. 2. The portion 300 of the processing system includes a SIMD unit 305 that is used to implement some embodiments of the SIMD units 211-213 shown in FIG. 2. In the illustrated embodiment, the SIMD unit 305 is executing threads in a workgroup 310. A context for the workgroup 310 is stored in a portion 315 of a set of registers 320. The SIMD unit 305 is able to access the context from the portion 315 and use the context to configure the SIMD unit 305 to execute the threads in the workgroup 310.

A workgroup 325 has been preempted from execution on the SIMD unit 305 and is waiting to resume execution on the SIMD unit 305. The workgroup 325 resumes execution in response to a signal acquiring a value. The signals are monitored, e.g., by a scheduler 330 that is configured to schedule waiting workgroups such as the workgroup 325 based on values of signals associated with the waiting workgroups, as discussed herein. In the illustrated embodiment, the signals are stored in a wait signal location 335. Prior to the workgroup 325 resuming execution, a context for the workgroup 325 is prefetched from system memory 340 into another portion 345 of the set of registers 320. The prefetched context is therefore available in the registers 320 prior to the workgroup 325 resuming execution, which reduces the latency required to preempt the workgroup 310 and resume execution of the workgroup 325.

Figure 4:
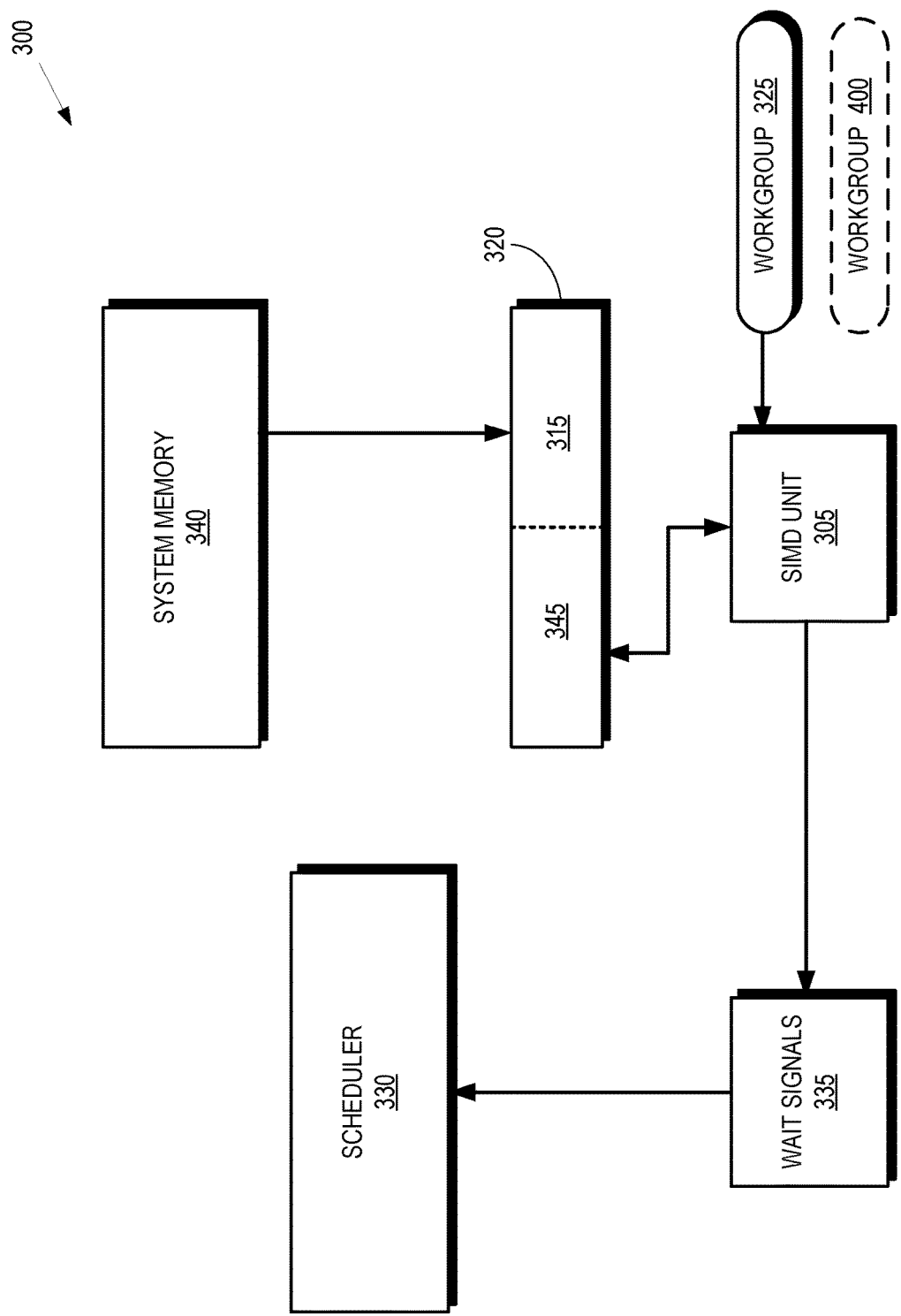
FIG. 4 is a block diagram of the portion of the processing system shown in FIG. 3 after resuming execution of a previously preempted workgroup according to some embodiments.

FIG. 4 is a block diagram of the portion 300 of the processing system shown in FIG. 3 after resuming execution of a previously preempted workgroup 325 according to some embodiments. In the illustrated embodiment, a signal stored in the wait signal location 335 has acquired a value associated with the waiting workgroup 325. Execution of the waiting workgroup 325 has therefore been resumed on the SIMD unit 305 based on the context stored in the portion 345 of the set of registers 320. The scheduler 330 scheduled the workgroup 325 for execution on the SIMD unit 305 in response to detecting that the signal acquired the value associated with the waiting workgroup 325. In the illustrated embodiment, another workgroup 400 is waiting to resume execution on the SIMD unit 305. A context for the workgroup 400 is therefore prefetched from the system memory 340 into the portion 315 that previously stored the context for the workgroup 310. The workgroup 400 (and its associated context) are identified based on a current value of the signal and a hint included in the wait instructions executed by the workgroup 400 prior to being preempted, as discussed herein. In some embodiments, the context for the workgroup 400 is prefetched into the region 315 concurrently with the SIMD unit 305 executing the workgroup 325 based on the context stored in the region 345.

Figure 5:
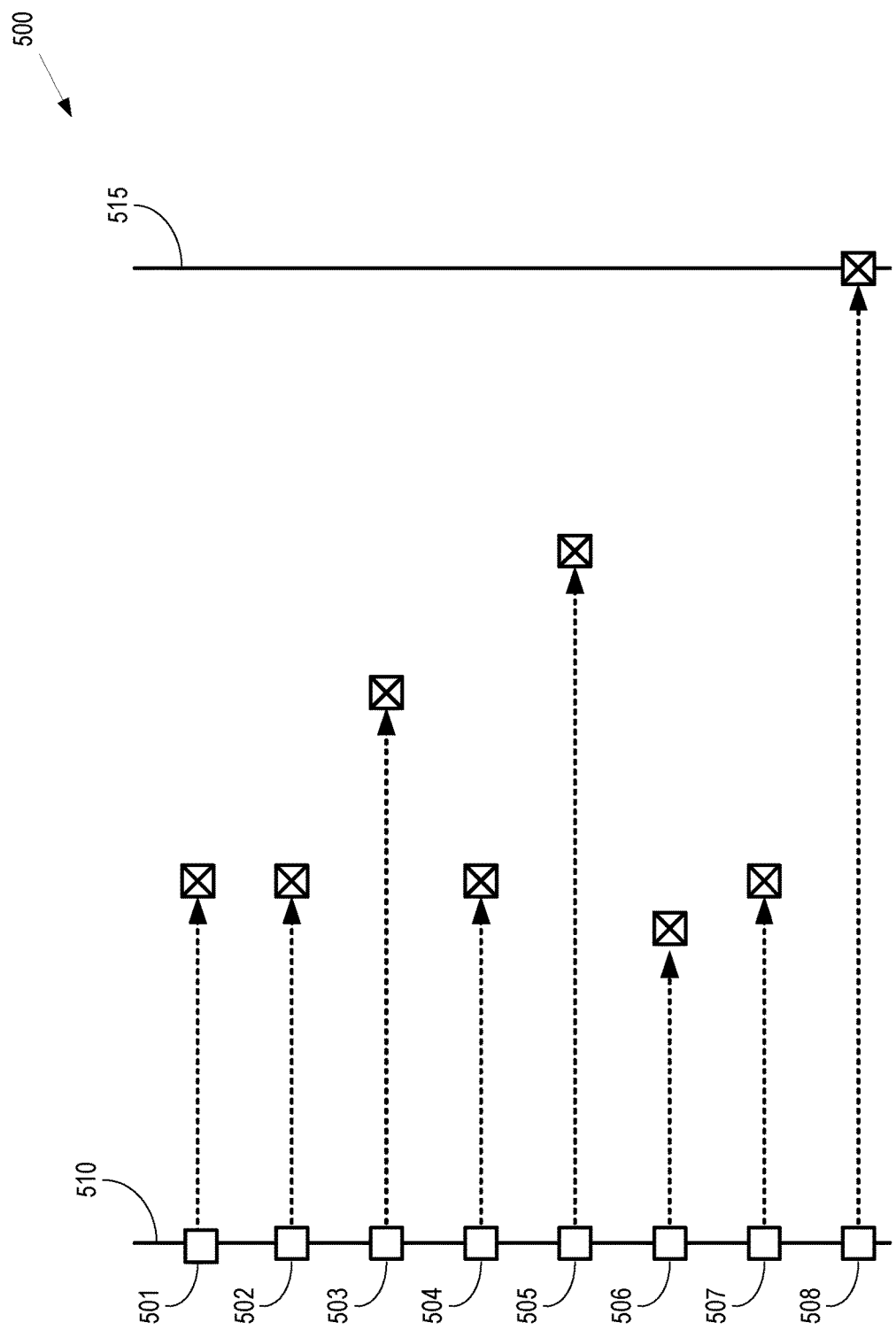
FIG. 5 is a block diagram of wait instructions that are executed by threads in a workgroup according to some embodiments.

FIG. 5 is a block diagram of wait instructions that are executed by threads in a workgroup 500 according to some embodiments. The wait instructions are executed by the threads 501, 502, 503, 504, 505, 506, 507, 508 (collectively referred to herein as "the wait instructions 501-508") on SIMD units such as the SIMD units 211-213 shown in FIG. 2 or the SIMD unit 305 shown in FIG. 3. In the illustrated embodiment, the wait instructions 501-508 begin execution at the same time 510 and complete at different times as indicated by the boxes containing crosses. In response to all of the wait instructions 501-508 completing at the time 515, the workgroup is available to be preempted until a signal acquires a value indicated in the wait instructions 501-508.

The wait instructions 501-508 also include a hint that indicates a type of modification that is applied to change the values of the signal. The type of modification includes incrementing the value of the signal by a predetermined amount corresponding to one or more threads, decrementing the signal by a predetermined amount corresponding to one or more threads, exchanging values of the signal from among a set of values, and the like. In some embodiments, the hint also includes information indicating a number of workgroups that are to be woken up and resume execution in response to the signal acquiring the value indicated in the wait instructions 501-508. The number of workgroups includes a single workgroup, all waiting workgroups associated with the value of the signal, a predetermined number of waiting workgroups associated with the value of the signal, and the like. Examples of wait instructions 501-508 are presented in Table 1.

TABLE 1

| | WGs to be woken up | |
|---|---|---|
| Signal Operation | One | Many |
| Exchange | wait_xchg_one | wait_xchg_many |
| Increment | wait_inc_one | wait_inc_many |
| Decrement | wait_dec_one | wait_dec_many |

Figure 6:
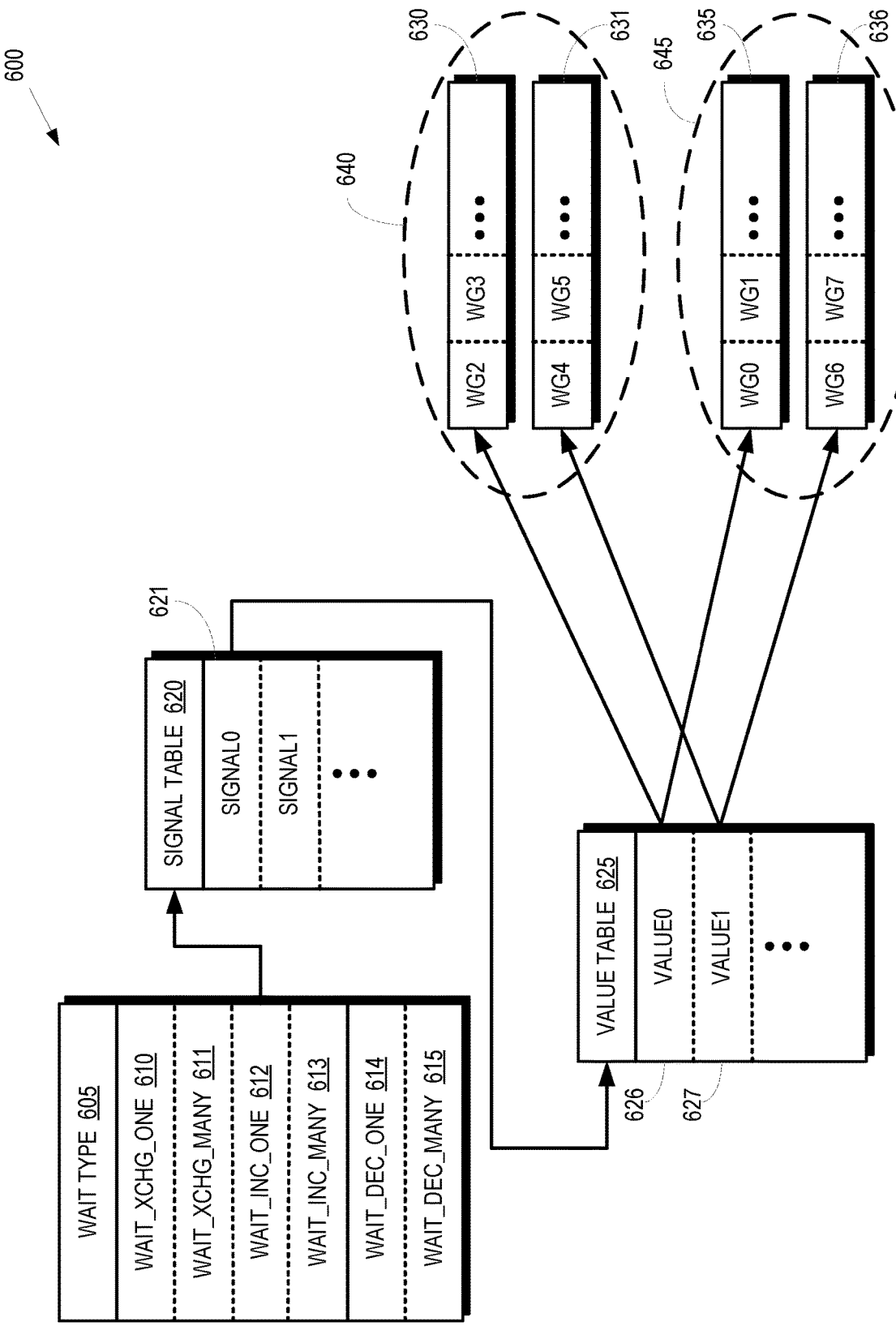
FIG. 6 is a block diagram of a scheduler that is configured to schedule waiting workgroups based on values of signals according to some embodiments.

FIG. 6 is a block diagram of a scheduler 600 that is configured to schedule waiting workgroups based on values of signals according to some embodiments. The scheduler 600 is used to implement some embodiments of the scheduler 330 shown in FIG. 3.

The scheduler 600 includes a wait type table 605 that includes entries for each type of modification of a signal. In the illustrated embodiment, the wait type table 605 includes an entry 610 for wait instructions associated with signals that are modified by exchanging values. The wait instructions associated with entry 610 indicate that one waiting workgroup is woken up to resume execution in response to a signal having a value equal to a value indicated in the corresponding wait instruction. The wait type table 605 includes an entry 611 for wait instructions associated with signals that are modified by exchanging values. The wait instructions associated with entry 611 indicate that many (e.g., a predetermined number or all) waiting workgroups are woken up to resume execution in response to the signal having a value equal to values indicated in wait instructions executed by the waiting workgroups. The wait instructions associated with the entries 612, 613 are for wait instructions associated with signals that are modified by incrementing the signal. The wait instructions associated with entry 612 indicate that one waiting workgroup is woken up to resume execution and the wait instructions associated with the entry 613 indicate that more than one workgroup is woken up to resume execution. The wait instructions associated with the entries 614, 615 are for wait instructions associated with signals that are modified by decrementing the signal. The wait instructions associated with the entry 614 indicate that one waiting workgroup is woken up to resume execution and the wait instructions associated with the entry 615 indicate that more than one workgroup is woken up to resume execution.

The entries 610-615 in the wait type table 605 each have a pointer to a corresponding table including signals associated with the different types of wait instructions. In the illustrated embodiment, the entry 612 includes a pointer to a signal table 620 that includes entries for corresponding signals. For example, if a workgroup executes a wait instruction that includes information indicating that a corresponding signal (SIGNAL0) is incremented and the workgroup is to be woken up in response to the corresponding signal having a value, information identifying the signal (SIGNAL0) is added to an entry 621 of the signal table 620.

Entries in the signal table 620 include pointers to tables that include values associated with waiting workgroups that are to be woken up in response to the signal having the value in the signal table 620. In the illustrated embodiment, entry 621 includes a pointer to a value table 625 that stores values of the signal associated with the entry 621 for one or more workgroups. Entries 626, 627 are associated with different values (VALUE0, VALUE1). The values in the entries 626, 627 indicate corresponding workgroups that are to be woken up in response to the signal in entry 621 having the values in the entries 626, 627. For example, the workgroups WG0, WG1, WG2, WG3 in the queues 630, 631 are to be woken up in response to the signal in entry 621 having the value in the entry 626. For another example, the workgroups WG4, WG5, WG6, WG7 in the queues 635, 636 are to be woken up in response to the signal in the entry 621 having the value in the entry 627.

In the illustrated embodiment, the queues 630, 631, 635, 636 that store identifiers of the waiting workgroups are partitioned into groups 640, 645 depending on whether contexts for the workgroups in the groups 640, 645 have been prefetched into registers associated with SIMD units, as discussed herein. Contexts for the workgroups in the queues 630, 631 in the group 640 have not yet been prefetched into the appropriate registers. Contexts for the workgroups in the queues 635, 636 in the group 645 have been prefetched into the appropriate registers. The latency for waking up the workgroups in the queues 635, 636 and resuming operation on a SIMD unit is therefore shorter than the latency for the workgroups in the queues 630, 631.

Contexts for the workgroups in the queues 630, 631 of the group 640 are prefetched by predicting a subsequent value of a signal based on a current value of the signal and a hint in the corresponding wait instruction that indicates the type of modification that is applied to the signal. Some embodiments predict the workgroups that will have their condition variable satisfied next in response to the current condition variable (i.e., a combination of the signal and the current value) being satisfied for another workgroup. For example, the scheduler 600 loads workgroup contexts into a prefetch portion of a register file in response to a condition variable (signalN, valueM) being satisfied. If the type of modification applied to the signal is "exchange," the scheduler 600 begins prefetching the remaining waiting workgroups for (signalN, valueM) because for this type of wait instruction the workgroups are only waiting on one value. Once the remaining waiting workgroups for (signalN, valueM) have resumed execution, the scheduler 600 predicts the next "exchanged" value of the signal from a set of possible values and begins prefetching workgroups that are waiting on the predicted condition variable. If the type of modification applied to the signal is "increment," the scheduler 600 begins prefetching workgroups that are waiting on the condition variable (signalN, valueM+1). If the type of modification applied to the signal is "decrement," the scheduler 600 begins prefetching workgroups that are waiting on the condition variable (signalN, valueM−1).

A ticket lock algorithm can be implemented using polling to determine values of a ticket number or a wait instruction. The polling algorithm uses a while loop to check the ticket number. Pseudocode for a polling algorithm is:

```
function FAMutexLock(Mutex)
    TicketNumber ← atomicInc(Mutex.ticket)
    while TicketNumber != atomicLd(Mutex.turn) do
        ;
    end while
end function
function FAMutexUnlock(Mutex)
    atomicInc(Mutex.turn)
end function
```

Pseudocode for a ticket lock algorithm implemented using a wait instruction is:

```
function FAMutexLock(Mutex)
    TicketNumber ← atomicInc(Mutex.ticket)
    wait_inc_one(Mutex.turn, TicketNumber)
end function
function FAMutexUnlock(Mutex)
    atomicInc(Mutex.turn)
end function
```

The wait instruction implementation of the ticket lock algorithm monitors a condition variable. One or more workgroups that are waiting on a subsequent value of the signal are prefetched in response to the condition variable being satisfied, i.e., the signal reaches the value that the other workgroups are waiting on.

Figure 7:
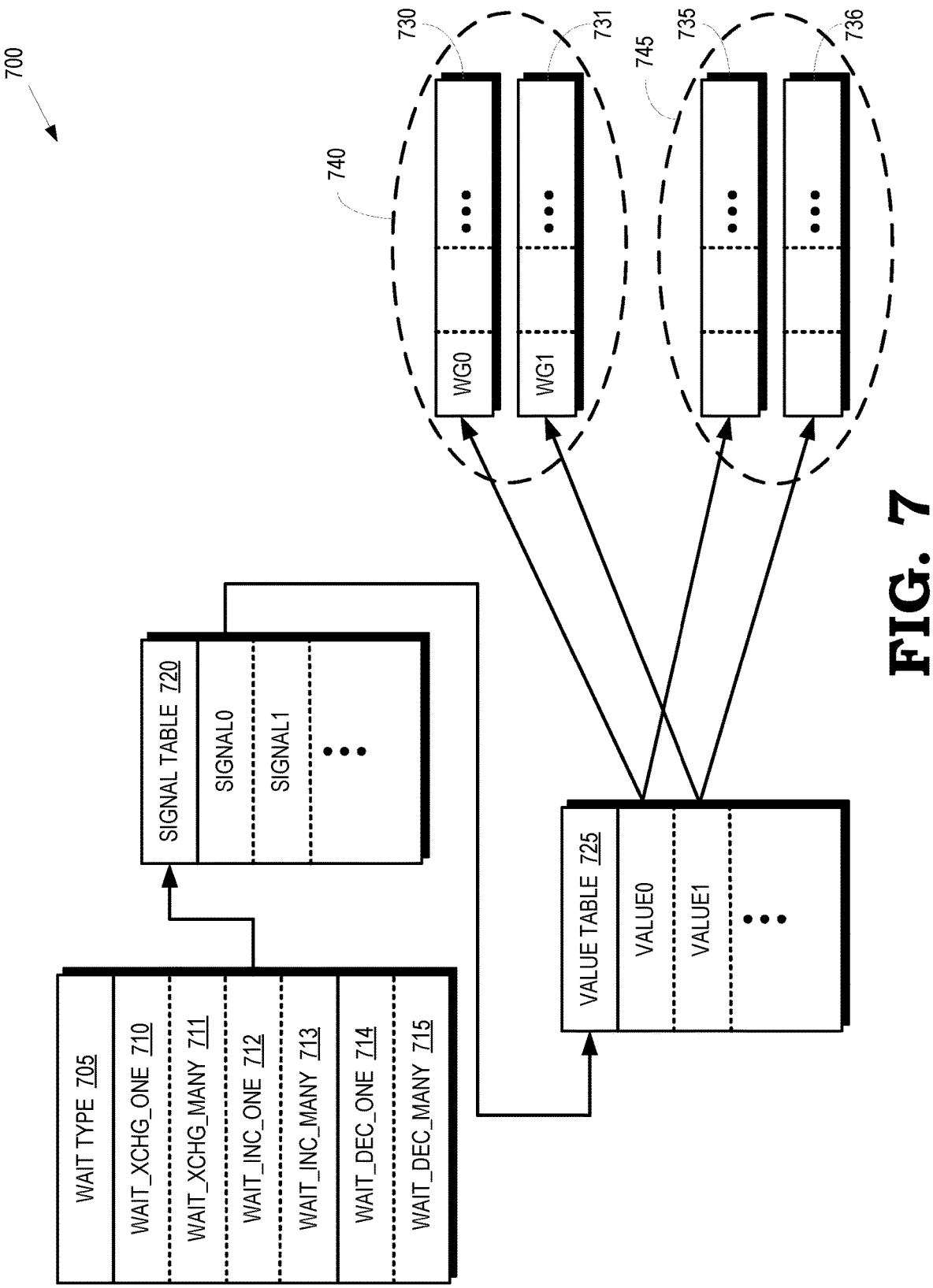
FIG. 7 is a block diagram of the scheduler that prefetches contexts of workgroups for applications such as a ticket lock according to some embodiments.

FIG. 7 is a block diagram of the scheduler 700 that prefetches contexts of workgroups for applications such as a ticket lock according to some embodiments. The scheduler 700 is used to implement some embodiments of the scheduler 330 shown in FIG. 3. The scheduler includes a wait type table 705 that has entries 710, 711, 712, 713, 714, 715 associated with wait instructions that are updated using different types of modification, a signal table 720, a value table 725, queues 730, 731 in a group 740, and queues 735, 736 in a group 745. The wait type table 705, the signal table 720, the value table 725, the queues 730, 731, 735, 736, and the groups 740, 745 are configured in a manner similar to the wait type table 605, the signal table 620, the value table 625, the queues 630, 631, 635, 636, and the groups 640, 645 shown in FIG. 6.

In the illustrated embodiment, a first workgroup (WG0) executes a wait instruction of the type wait_inc_one. The wait instruction includes a wait value (VALUE0) that indicates that the first workgroup is to be woken up when the signal (SIGNAL0) is modified to have the wait value that is indicated in the wait instruction. The first workgroup is then added to the queue 730 in the group 740. A second workgroup (WG1) executes a wait instruction of the type wait_inc_one. The wait instruction includes a wait value (VALUE1) that indicates that the second workgroup is to be woken up when the signal (SIGNAL0) is modified to have the wait value indicated in the wait instruction. The second workgroup is then added to the queue 731 in the group 740. Subsequently, the condition variable (SIGNAL0, VALUE0) is satisfied and the first workgroup is woken up and resumes execution.

Figure 8:
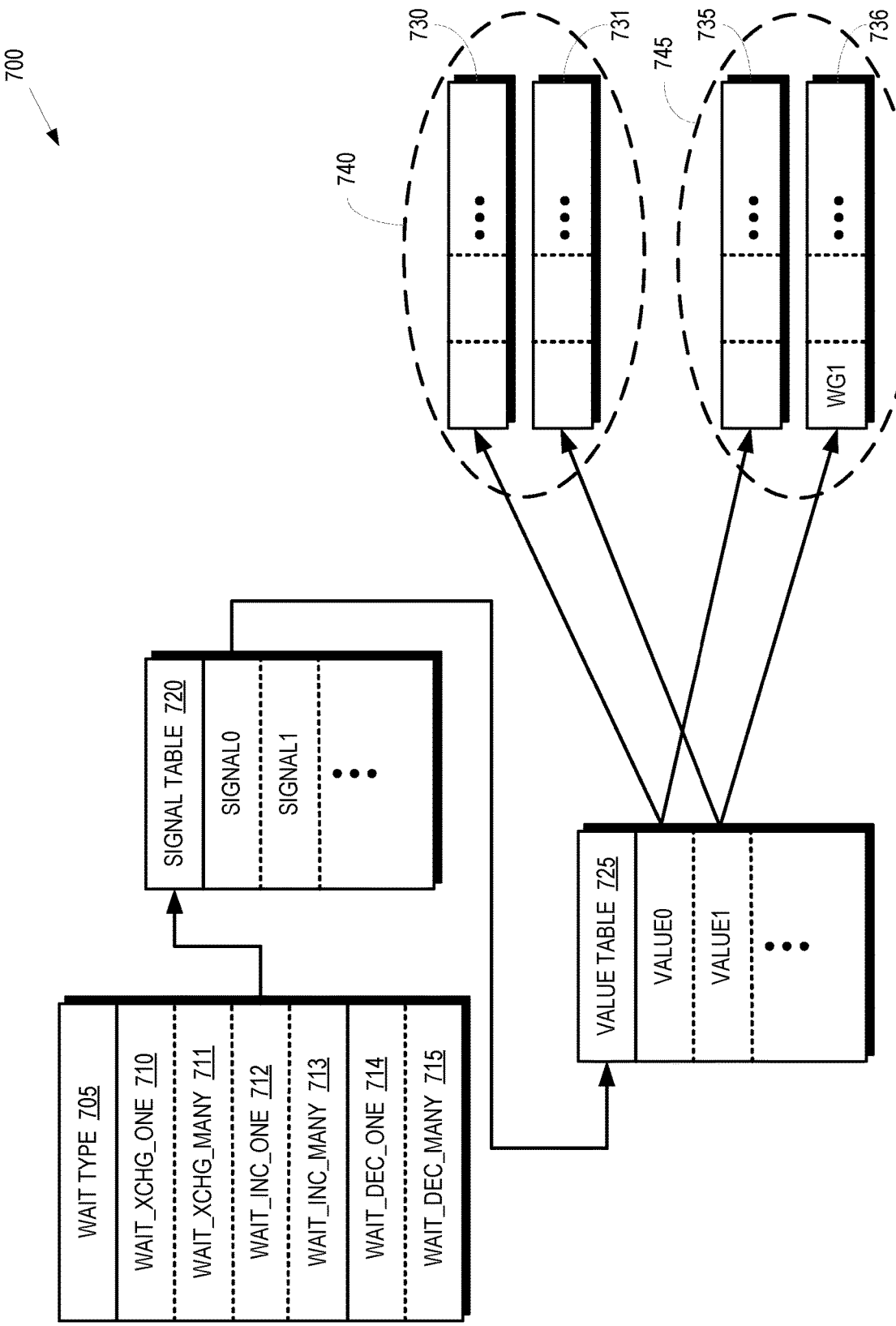
FIG. 8 is a block diagram of the scheduler after the condition variable has been satisfied for a first workgroup according to some embodiments.

FIG. 8 is a block diagram of the scheduler 700 after the condition variable has been satisfied for a first workgroup according to some embodiments. In the illustrated embodiment, the first workgroup (WG0) has been removed from the queue 730 because the first workgroup has resumed execution in response to the condition variable (SIGNAL0, VALUE0) being satisfied. The scheduler 700 predicts a subsequent value of the signal based on the type of modification of the signal indicated in the wait instruction, e.g., the scheduler 700 predicts that the signal will be incremented from VALUE0 to VALUE1. The predicted value of the signal indicates that the condition variable (SIGNAL0, VALUE1) for the second workgroup (WG1) is going to be satisfied so that the second workgroup will be woken up and scheduled for execution. The scheduler 700 therefore prefetches a second context for the second workgroup into the appropriate register files. The scheduler 700 also moves the second workgroup from the queue 731 in the group 740 to the queue 736 in the group 745 to indicate that the second context has been prefetched.

Figure 9:
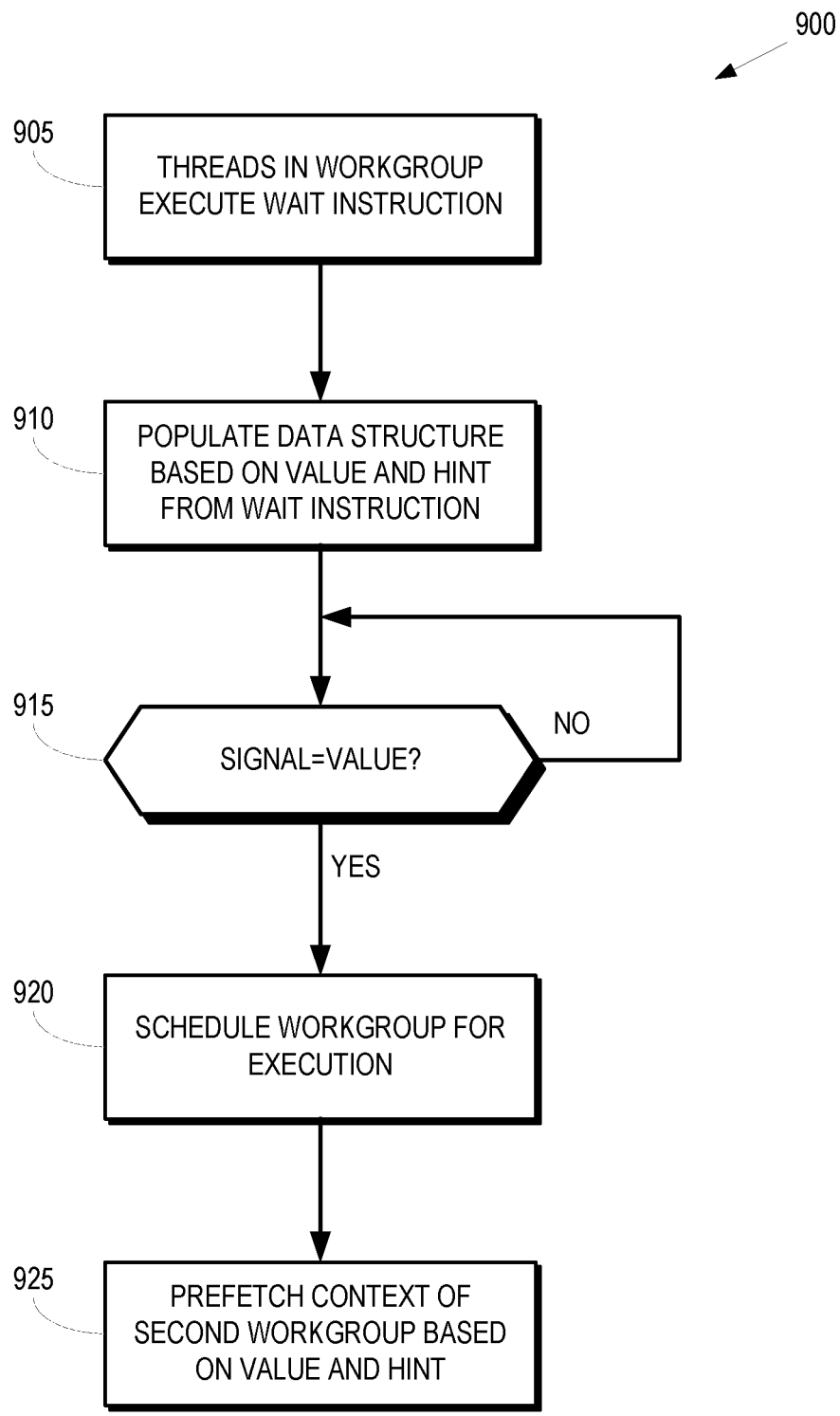
FIG. 9 is a flow diagram of a method of scheduling waiting workgroups for execution and prefetching contexts for waiting workgroups according to some embodiments.

FIG. 9 is a flow diagram of a method 900 of scheduling waiting workgroups for execution and prefetching contexts for waiting workgroups according to some embodiments. The method 900 is implemented in some embodiments of the processing system 100 shown in FIG. 1, the processor core 200 shown in FIG. 2, the scheduler 330 shown in FIG. 3, the scheduler 600 shown in FIG. 6, and the scheduler 700 shown in FIG. 7.

At block 905, the threads in a workgroup execute a wait instruction, e.g., as shown in FIG. 5. The workgroup is preempted in response to all of the threads in the workgroup completing execution of the wait instruction.

At block 910, a data structure in the scheduler is populated based on a value of a signal indicated in the wait instruction and a hint in the wait instruction. Some embodiments of the data structure include a wait type table, a signal table, a value table, and one or more queues and groups that indicate whether waiting workgroups have been prefetched or not, as discussed herein. The hint indicates a type of modification to the signal such as increment, decrement, or exchange.

At decision block 915, the scheduler determines whether a condition variable (i.e., a combination of a signal and a value) is satisfied by having the value of the signal equal to the value indicated in the wait instruction. If not, the scheduler continues to monitor the signal. If the condition variable is satisfied, the method 900 flows to block 920.

At block 920, the workgroup is scheduled for execution. If a context for the workgroup has not been prefetched into the appropriate register file, the scheduler initiates fetching of the context into the register file. Execution of the workgroup begins after the context for the workgroup has been fetched. If the context for the workgroup has been prefetched into the appropriate register file, the workgroup is immediately scheduled for execution.

At block 925, a context of a second workgroup is prefetched based on a current value of the signal and a hint in the wait instruction that was executed by the second workgroup prior to the second workgroup being preempted. For example, the context of the second workgroup is prefetched in response to a predicted subsequent value of the signal being equal to the value of the signal indicated in the wait instruction that was executed by the second workgroup.

In some embodiments, the apparatus and techniques described above are implemented in a system comprising one or more integrated circuit (IC) devices (also referred to as integrated circuit packages or microchips), such as the processing system described above with reference to FIGS. 1-9. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   determining a current value of a signal equals a first value;
   scheduling a first workgroup for execution on a processor core, based on a first context, in response to the current value of the signal having the first value;
   issuing, a first wait instruction in response to a completion of each thread from the first workgroup, wherein the first wait instruction includes the first value of the signal and a first hint that indicates whether a value of the signal is to be incremented, decremented, or exchanged with another value of the signal;
   preempting the first workgroup in response to the issuing of the first wait instruction;
   modifying the current value of the signal from the first value to a second value;
   scheduling a second workgroup for execution on the processor core, based on a second context, in response to the preempting of the first workgroup and in response to the current value of the signal having the second value;
   predicting a subsequent value of the signal based on the second value and whether the first hint indicates that the signal is to be incremented, decremented, or exchanged; and
   prefetching a third context into registers of the processor core based on the predicted subsequent value of the signal.

2. The method of claim 1, wherein preempting the first workgroup comprises storing the first context in a memory, and wherein scheduling the second workgroup for execution comprises writing the second context from the memory into the registers of the processor core.

3. The method of claim 2, wherein writing the second context from the memory into the registers of the processor core comprises prefetching the second context from the memory into the registers of the processor core prior to preempting the first workgroup.

4. The method of claim 3, wherein the first context is stored in a first portion of the registers prior to preempting the first workgroup, and wherein the second context is prefetched into a second portion of the registers prior to preempting the first workgroup, the first portion being different than the second portion.

5. The method of claim 1, wherein prefetching the third context comprises prefetching the third context in response to the subsequent value having a third value associated with a third workgroup that executes based on the third context.

6. The method of claim 1, further comprising:
   storing information identifying the first workgroup in a first queue in response to preempting the first workgroup, wherein the first workgroup is scheduled for execution on the processor core based on the information identifying the first workgroup in the first queue.

7. The method of claim 6, further comprising:
prefetching the first context from a memory into the registers prior to resuming execution of the first workgroup; and
moving the information identifying the first workgroup from the first queue to a second queue in response to prefetching the first context from the memory, wherein the first workgroup is scheduled for execution on the processor core based on the information identifying the first workgroup in the second queue.

8. An apparatus comprising:
a processor core to schedule and execute workgroups based on contexts stored in a set of registers,
wherein a first workgroup is scheduled for execution on the processor core, based on a first context, in response to a signal having a first value;
wherein a first wait instruction that includes the first value of the signal and a first hint that indicates whether a value of the signal is to be incremented, decremented, or exchanged with another value of the signal is issued in response to a completion of each thread of the first workgroup;
wherein the first workgroup is preempted in response to the issuing of the first wait instruction;
wherein the signal is modified from the first value to a second value subsequent to executing the first wait instruction;
wherein a second workgroup is scheduled for execution on the processor core, based on a second context, in response to preempting the first workgroup and in response to the signal having the second value;
wherein a subsequent value of the signal is predicted based on the second value and whether the first hint indicates that the signal is to be incremented, decremented, or exchanged; and
wherein a third context is prefetched into the set of registers based on the predicted subsequent value of the signal.

9. The apparatus of claim 8, further comprising:
a memory, wherein the first context is stored in the memory in response to preemption of the first workgroup, and
wherein the second workgroup is scheduled for execution comprises writing the second context from the memory into the set of registers.

10. The apparatus of claim 9, wherein the second context is prefetched from the memory into the set of registers of the processor core prior to preemption of the first workgroup.

11. The apparatus of claim 10, wherein the first context is stored in a first portion of the set of registers prior to preemption of the first workgroup, and wherein the second context is prefetched into a second portion of the set of registers prior to preemption of the first workgroup, the first portion being different than the second portion.

12. The apparatus of claim 8, wherein the third context it is prefetched in response to the subsequent value having a third value associated with a third workgroup that executes based on the third context.

13. The apparatus of claim 8, further comprising:
a first queue to store information identifying the first workgroup in response to preemption of the first workgroup, wherein the first workgroup is scheduled for execution on the processor core based on information identifying the first workgroup in the first queue.

14. The apparatus of claim 13, wherein the first context is prefetched from a memory into the set of registers prior to resuming execution of the first workgroup, and further comprising:
a second queue to store the information identifying the first workgroup in response to prefetching the first context from the memory, wherein the first workgroup is scheduled for execution on the processor core based on the information identifying the first workgroup in the second queue.

15. A method comprising:
determining a current value of a signal;
predicting a value of the signal based on the current value of the signal and whether a hint indicates the signal is to be incremented, decremented, or exchanged, wherein the predicted value of the signal is determined to be equal to a first value associated with a first workgroup;
prefetching a first context of the first workgroup into registers of a processor core in response to the predicted value of the signal being equal to the first value associated with the first workgroup;
executing, concurrently with the prefetching of the first context, a second workgroup on the processor core based on a second context stored in the registers, wherein the second workgroup completes one or more threads and issues a wait instruction in response to the completion of each thread, the wait instruction including the current value of the signal and the hint;
preempting the second workgroup in response to the issuing of the wait instruction; and
scheduling the first workgroup for execution on the processor core in response to preempting the second workgroup and in response to the signal having the first value.

16. The method of claim 15, further comprising:
prior to scheduling the first workgroup, modifying the signal from the current value to the predicted value.

17. The method of claim 15, further comprising:
predicting, concurrently with executing the first workgroup, a second predicted value of the signal based on the predicted value of the signal and whether a second hint indicates the signal is to be incremented, decremented, or exchanged.

18. The method of claim 17, further comprising:
prefetching a third context of a third workgroup into the registers of the processor core in response to the second predicted value of the signal being equal to a second value associated with the third workgroup.

19. The method of claim 17, further comprising:
prefetching the second context of the second workgroup into the registers of the processor core in response to the second predicted value of the signal being equal to a second value associated with the second workgroup.

20. The method of claim 15, wherein preempting the second workgroup comprises storing the second context in a memory, and wherein scheduling the first workgroup for execution comprises writing the first context from the memory into the registers of the processor core.

* * * * *

UNITED STATES PATENT AND TRADEMARK OFFICE
CERTIFICATE OF CORRECTION

| | |
|---|---|
| PATENT NO. | : 11,481,250 B2 |
| APPLICATION NO. | : 16/024244 |
| DATED | : October 25, 2022 |
| INVENTOR(S) | : Alexandru Dutu et al. |

Page 1 of 1

It is certified that error appears in the above-identified patent and that said Letters Patent is hereby corrected as shown below:

In the Claims

At Column 13 Line 57, in Claim 12, Line 1, please delete "it" after "context"

Signed and Sealed this
Twenty-first Day of February, 2023

Katherine Kelly Vidal
*Director of the United States Patent and Trademark Office*